United States Patent [19]

Reed et al.

[11] 3,809,815

[45] May 7, 1974

[54] COMMUNICATION SYSTEM UTILIZING FREQUENCY DIVISION MULTIPLEXING TO LINK A PLURALITY OF STATIONS EACH CONTAINING A SWITCHABLE SYNTHESIZER

[75] Inventors: Joseph Reed, Stamford; Joseph F. De Lorenzo, Rowayton, both of Conn.

[73] Assignee: Litton Systems, Inc., Beverly Hills, Calif.

[22] Filed: May 4, 1972

[21] Appl. No.: 250,228

[52] U.S. Cl. .......... 179/15 FD, 179/2.5 R, 307/232, 331/38

[51] Int. Cl. .......... H04j 1/06

[58] Field of Search .......... 179/15 FD, 15 FS, 2.5 R; 325/184; 331/19, 37, 38; 307/232

[56] References Cited

UNITED STATES PATENTS

| | | | |
|---|---|---|---|
| 3,548,106 | 12/1970 | Watson | 179/2.5 R |
| 3,550,132 | 12/1970 | Kurth | 179/2.5 R |
| 2,819,344 | 1/1958 | Thompson | 179/15 FS |
| 2,721,897 | 10/1955 | Schneckloth | 179/2.5 R |
| 2,607,853 | 8/1952 | Bellaire | 179/15 FD |
| 3,537,026 | 10/1970 | Leonard | 331/38 |
| 3,551,826 | 12/1970 | Sepe | 331/38 |

*Primary Examiner*—Kathleen H. Claffy
*Assistant Examiner*—David L. Stewart

[57] ABSTRACT

A switchable communications system utilizing frequency division multiplexing is shown for providing communication between a plurality of stations, each including a synthesizer and each operated from a single reference frequency. Each station is assigned a fixed home frequency at which it transmits information. When calling, the synthesizer within the calling station adjusts the transmit frequency of that station to correspond to the receive frequency of the called station, which automatically adjusts the receive frequency of the calling station to correspond to the transmit frequency of the called station. Full duplex transmission is thus permitted between any and all stations within the communications system through the utilization of a wide range acquisition synthesizer within each station.

10 Claims, 7 Drawing Figures

COMMUNICATION SYSTEM UTILIZING FREQUENCY DIVISION MULTIPLEXING TO LINK A PLURALITY OF STATIONS EACH CONTAINING A SWITCHABLE SYNTHESIZER

BACKGROUND OF THE INVENTION

The present invention relates to a communications system utilizing frequency division multiplexing (FDM) to link a plurality of stations, each containing a synthesizer and, more particularly, to an FDM telephone communications system having a frequency plan that permits switchable full duplex transmission between any and all stations, and a synthesizer within each station that permits successful implementation of the frequency plan.

Telephone systems of the prior art utilize central switching that is generally designed as a blocking system in order to reduce the cost and increase the number of system users. Since each subscriber station in a central switching system requires physical connection, it is not practical to provide a system which can interconnect all possible combinations or subscriber pairs simultaneously within that system. The number of stations which can be provided in a system for a predesigned probability of blocking is determined by the established intensity of traffic in Erlangs, one Erlang being defined as equal to the number of calls times length of calls, divided by time in hours. When the traffic within a central switching system increases above the designed amount, the amount of system degradation increases in a disproportionate manner. For example, in a fifty-station system, a 30 percent increase in peak traffic can reduce the grade of service from one blocked call in a thousand to one blocked call in thirty. Such an increase in traffic can be temporary or permanent and can be due to an increased number of calls being placed per subscriber, more time spent per call, an increased number of subscribers, or a change in the traffic pattern. If the change is permanent, the central switch can be expanded to accommodate it. If the change is temporary or due to an emergency, the degradation in grade of service is unavoidable.

The FDM telephone communications system of the present invention is a non-blocking system as it allows all subscribers within the system to place calls quickly and directly, and guarantees that any subscriber will be able to reach any other subscriber at any time.

A central switching system of the prior art is susceptible to catastrophic failure should the central switch become damaged or fail in one of a number of ways. The telphone communications system of the present invention provides a highly reliable system due to the decentralized approach wherein there is no central switch and each subscriber station is, due to its unique synthesizer, its own central switch. A failure in the system described here simply disables the single subscriber involved. Further, the frequency plan of the FDM communications system makes it possible to use a single cable connecting all subscribers within the system which is easily installed compared to the numerous twisted wires required by a central switching system. Each subscriber station within the present system may be quickly and easily altered without extensive rewiring as in the central switching system.

The FDM telephone communications system of the present invention is capable of accommodating from ten to one thousand subscriber stations without using a centralized switch. This arrangement is advantageous even over a time division multiplexing (TDM) approach to telephone communications since time division multiplexing cannot service the maximum number of stations distributed over a single cable that frequency division multiplexing can. Further, due to the requirement for directed signal flow and the inherent random time delay in a cable system, time division multiplexing synchronization equipment becomes extremely complex.

Some prior art communications systems have utilized frequency division multiplexing wherein each station communicates with another at a single frequency over a pair of transmit and receive cables or highways. The present invention uses two distinct frequencies to transmit and receive over a single cable. This arrangement simplifies system implementation and installation. It also reduces the problems of connection between the highways and makes it possible to introduce signal amplification so as to extend the range of operation. The station synthesizer and the frequency plan implemented by it at each station makes these improvements possible.

SUMMARY OF THE INVENTION

It is accordingly an object of the present invention to provide an improved FDM telephone communications system and a frequency plan therefor that establishes non-blocking full duplex operation between a plurality of stations, each containing a synthesizer that makes it possible to implement the frequency plan.

Another object of the present invention is to provide an FDM telephone communications system which is substantially reduced in complexity compared to other systems, reliable, has a low installation cost, and is easily adapted to changing user requirements.

A further object of the invention described herein is to provide a telephone communications system with a plurality of stations, each containing a synthesizer for implementing a frequency plan which establishes an automatic relationship betwen the frequencies of the calling and called stations wherein the calling station is tuned to the receiver frequency of the called station and automatically adjusts itself to receive the transmission frequency of the called station.

A still further object of the invention herein presented is to provide an FDM communications system which communicates between subscriber stations over a wide frequency range and to provide a synthesizer within each subscriber station capable of generating all frequencies within the system frequency range while being further capable of rapidly adjusting the output frequence signal thereof from one fixed value to another within the wide frequency range.

In accomplishing these and other objects, there has been provided a plurality of communication stations coupled to a single cable via transmit and receive circuit paths. A synthesizer within each station adjusts its output frequency when that station is calling another called station to establish a frequency that is applied to the first transmit circuit path where it is modulated with a system reference frequency carrying information to be communicated to the called station. The frequency applied from the transmit circuit path to the cable has been modulated with the system reference signal to match the fixed home receiver frequency of the called station. The synthesizer in the calling station also applies its established frequency to the receive circuit path therein for automatically adjusting that circuit path to receive the transmit frequency from the called station. The FDM communications system thus provides full duplex transmission between all stations attached to the cable through a frequency plan and individual station synthesizers which implement that plan.

DESCRIPTION OF THE DRAWINGS

A better understanding of the present invention and of the objects and appendant advantages thereof will be obtained by reference to the following description when considered in connection with the accompanying drawings, wherein.

DESCRIPTION OF THE PREFERRED EMBODIMENT

Figure 1:
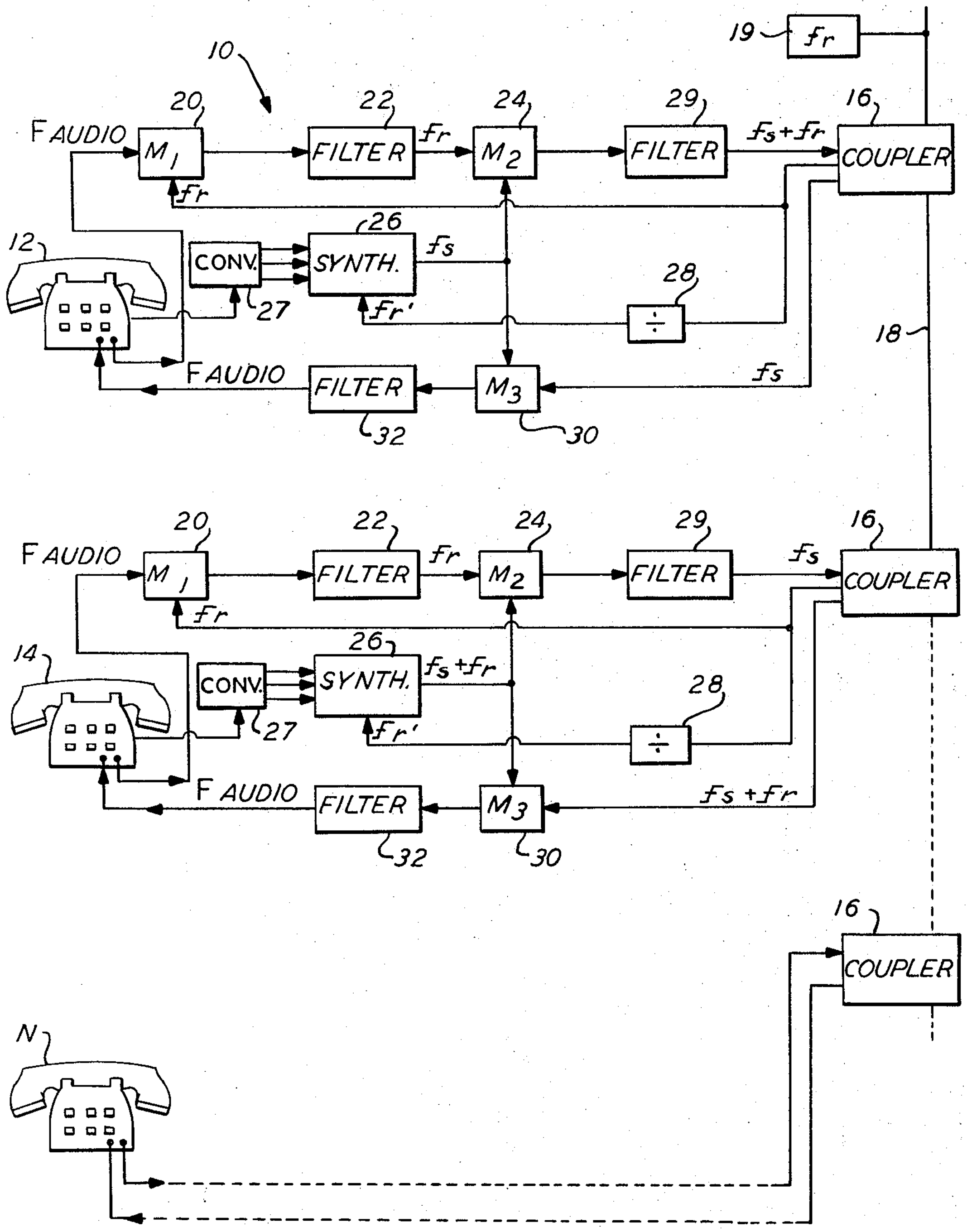
FIG. 1 is a block diagram showing the communications system of the present invention.

Referring now to the drawings, FIG. 1 shows a telephone communications system 10 which utilizes a frequency division multiplexing arrangement for connecting a plurality of subscriber stations 12, 14 through N to one another for permitting full duplex, non-blocking transmission between all stations. The stations are coupled through magnetic couplers 16 to a communication highway in the form of a coaxial cable 18. The couplers 16 also provide a reference frequency $f_r$ to each station. The reference frequency $f_r$ is generated by a system frequency generator 19 connected to the coaxial cable 18. In the present embodiment, a number of stations may be attached to a multi-coupler which, in turn, provides a signal to each of the stations separately. DC power supply may be locally generated either at each station 12 or at a multi-coupler 16.

A typical station includes a handset in which a transmitter and receiver is located, as is well known. The transmitter applies an audio frequency to the input of a transmit circuit path formed by an input port of a balanced modulator 20 which is excited by the reference frequency $f_r$ applied thereto from magnetic coupler 16. The reference frequency which is distributed throughout the entire system is arranged to be outside the bandwidth of communication of the system. Its relationship to other communication frequencies will be demonstrated hereinbelow.

Audio signals entering the modulator 20 are modulated to produce a double sideband whose frequency is $f_r \pm f_{audio}$. This signal is then passed through a single sideband filter 22 which removes the remaining carrier and one of the two sidebands. As is known, a balanced modulator, specifically a push-pull circuit, introduces a carrier and a modulating signal such that after modulation takes place, the output contains generally the two sidebands with the carrier much reduced. The output of the filter 22 which removed one sideband is thus $f_r + f_{audio}$. A second balanced modulator 24 receives the reference frequency plus audio signal $f_r + f_{audio}$ from the filter 22 at a first input port. The carrier applied to the second input port of the balanced modulator 24 is a frequency $f_s$ derived from a programable digital frequency synthesizer 26. The programable or adjustable frequency output of the synthesizer 26 is controlled by digital signals which may be generated from station 12 through a suitable digital signal converter such as a dual tone to digital signal converter 27. The synthesizer is driven by a reference frequency $f_r'$ derived by dividing the system reference signal $f_r$ in a divider 28, as will be described further hereinbelow. The output of modulator 24 is thus two sidebands at the frequency $f_s \pm (f_r + f_{audio})$ which is applied to the input terminal of a band pass filter 29 having a band pass width equal to or less than $2f_r$. That is, the band pass filter 29 will pass either the signal $f_s + f_r + f_{audio}$ or $f_s - (f_r + f_{audio})$ depending on the operational mode in use but will not pass both signals.

The total bandwidth of the frequency division multiplexing communications system is restricted to less than an octave so that no station frequency second harmonic will fall within the usable bandwidth of a second station, thereby creating interference between stations. A more complete discussion of the reference frequency $f_r$, bandwidth of operation, and number of possible stations within a typical system is set out hereinbelow with reference to FIGS. 2*a* and 2*b*.

The output signal from the band pass filter 29, for example $f_s + f_r + f_{audio}$ is applied to the input port of a magnetic coupler 16 and then via a coaxial cable 18 to subsequent couplers of the various stations 14 through N. Note that the magnetic coupler 16 also applies a received frequency signal to the input of a receive circuit path within station 12 which is formed by an input port of a third balanced modulator 30. Modulator 30 also receives a carrier input which is the output frequency $f_s$ of the programable synthesizer 26. If the inputs from the synthesizer 26 and the coupler 16 have the same carrier frequency $f_s$, the output from the modulator 30 will contain only the audio signal $f_{audio}$. Under these circumstances, the balanced modulator excited by the same frequency inputs will detect audio signals adjacent to that frequency in a manner known as synchronous detection. The output from the modulator 30 is then passed through a low band pass audio filter 32 to eliminate any undesirable frequencies outside the audio pass band. Thus, the output of filter 32 includes only the audio frequency $f_{audio}$ which is applied to the receiver of station 12.

By reference to FIG. 1, it will be apparent that the stations 14 through N are arranged with identical transmit and receive circuit paths, each utilizing a programable digital frequency synthesizer 26 and the same reference frequency $f_r$. In the present invention, each station is assigned a fixed home frequency at which it receives modulated audio information and passes that information through its balanced modulator 30 by removing the carrier and detecting the audio signal. The audio signal is then applied to the receiver within the handset. While each station receives audio information at its assigned fixed home frequency, it automatically transmits audio information at a second fixed home frequency whose difference, in the present embodiment, represents the assigned fixed home frequency plus the reference frequency $f_r$. For example, station 12 may be assigned a fixed home frequency of 12.01 Megahertz (MHz). If the reference frequency $f_r$ is assigned a frequency of 2.5 MHz, the transmission frequency of station 12 is automatically fixed at 14.51 MHz.

As previously mentioned, the total bandwidth of the FDM communications system is restricted to less than an octave. That is, the ratio between the highest carrier frequency $f_2$ and the lowest carrier frequency $f_1$ within the frequency bandwidth of the system should be less than 2, see FIG. 2a.

$$f_2/f_1 \leq 2$$

Further, the lower frequency $f_1$, when substracted from the upper frequency $f_2$, should be equal to, or less than, two times the reference frequency $f_r$.

$$f_2 - f_1 \leq 2f_r$$

To calculate the number of channels N for a full duplex system, let:

$k$ = *audio bandwidth*
$g$ = *guard bandwidth*
$\Delta f$ = bandwidth per channel
$\Delta f = 2k + g$
$N = f_2 - f_1/2\,\Delta f$ For $f_2 - f_1$, to approach a maximum:
$f_2 - f_1 = 2f_r$
therefore $N = f_r/\Delta f$ If $f_r$ = 2.5 MHz, then:
$f_1$ min. = 5 MHz
$f_2$ max. = 10 MHz If $\Delta f$ = 10 KHz, then:
$N = f_r/\Delta f = 2{,}500/10 = 250$ channels In the present embodiment, $f_1$ = 10 MHz and $f_2$ = 15 MHz. With these values, the total number of channels N again equals 250. It will be seen that $f_2$ could be 20 MHz. Then, the reference frequency $f_r$ would equal 5 MHz and the total number of channels N would equal 500.

Figure 2A:
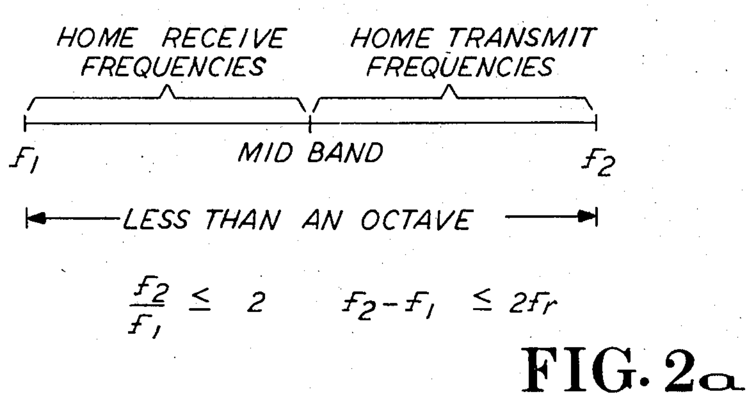
FIGS. 2*a* and 2*b* are diagrams useful in explaining the frequency plan of the FDM communications system.
Figure 2B:
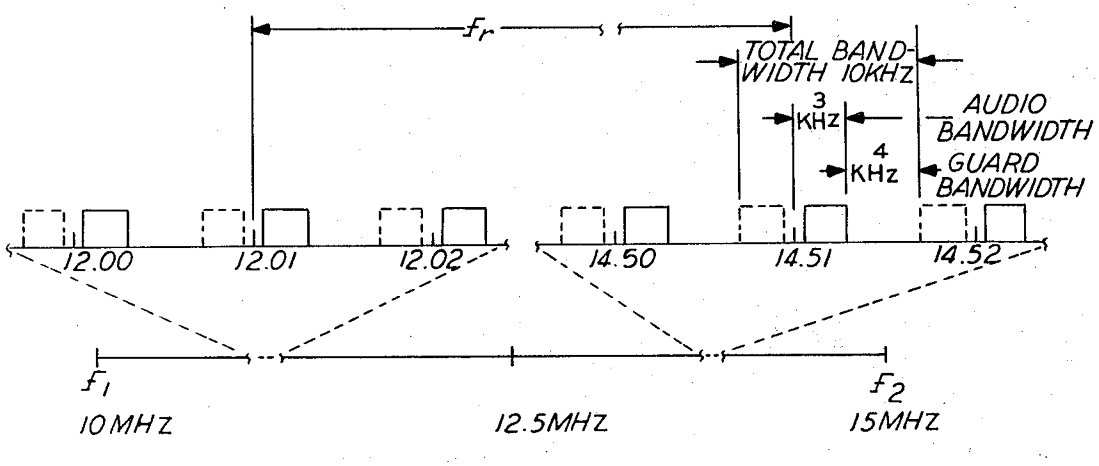

Referring now to FIGS. 2a and 2b, the minimum frequency $f_1$ and maximum frequency $f_2$ are represented by a line showing the various frequencies within the band-width of the FDM communications system between $f_1$ and $f_2$ wherein the lower frequencies represent the fixed home receive frequencies and the higher frequencies represent the fixed home transmit frequencies. In the present system, 250 channels are provided between 10 MHz and 15 MHz with the reference frequency established at 2.5 MHz. It will be seen that each station 12 through N is assigned a different fixed home frequency. For example, station 12 is assigned a receive frequency of 12.01 MHz. The audio sideband of each channel is 3 KHz wide with the guard band between it and the next frequency being 4 KHz wide. Thus, the next assigned receive frequency is 12.02 MHz. Station 12 then transmits on a fixed home frequency of 14.51 MHz, while the next station transmits at a frequency of 14.52 MHz.

Figure 3:
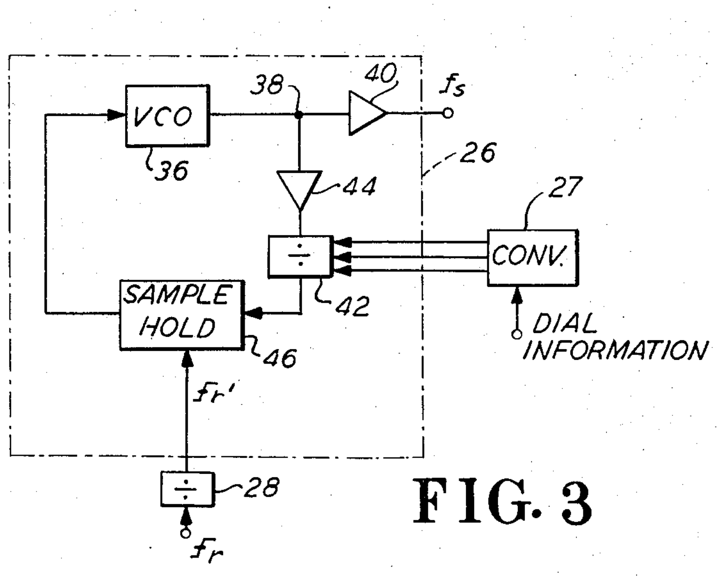
FIG. 3 is a block diagram showing the synthesizer used within each station of the communications system.

In FIG. 3, a typical programable digital frequency synthesizer 26 is shown driven by a reference frequency $f_r'$ derived from the divider 28. The synthesizer also receives a digital input signal from the dialing signal converter 27. The synthesizer 26 includes a voltage controlled oscillator 36 whose frequency output $f_s$ is applied to a junction 38 and then to the input of a signal amplifier 40 prior to being applied to the transmit circuit path and the receive circuit path of each station 12 through N. The synthesizer 26 is a phase-locked loop synthesizer that automatically sets itself to the proper frequency determined by a variable ratio divider 42. Divider 42 receives an input frequency signal from junction 38 through a second signal amplifier 44 and receives a digital signal from the converter circuit 27. The divider 42 divides the input frequency in accord with instructions from the dialing signal. The output of the variable divider 42 is applied to the input terminal of a sample and hold circuit 46 which compares that signal with the reference frequency signal $f_r'$ through phase detection. The DC output from the sample and hold circuit 46 is then applied to the voltage variable capacitor within the tank circuit of the voltage control oscillator 36 for completing the phase-locked loop of the synthesizer 26.

In the preferred embodiment, if the synthesizer 26 is operating in its normal standby condition, it is generating a fixed home receive frequency, for example, of station 12 or 12.01 MHz. The reference frequency $f_r$ is divided by the divider 28 to produce a synthesizer reference frequency $f_r'$ of 10 KHz. In this arrangement, the digital dialing input to the variable ratio divider is 12.01. The divider, which in the preferred embodiment is a thick film assembly in the form of a counter, then produces one output pulse for every 1201 cycles of the input signal $f_s$ received from the voltage controlled oscillator. Thus, it will be seen that the output of the variable ratio divider equals 10 KHz. That is, when the voltage controlled oscillator operates at the desired frequency of 12.01 MHz, the output of the sample and hold circuit is a constant DC level.

Figure 4:
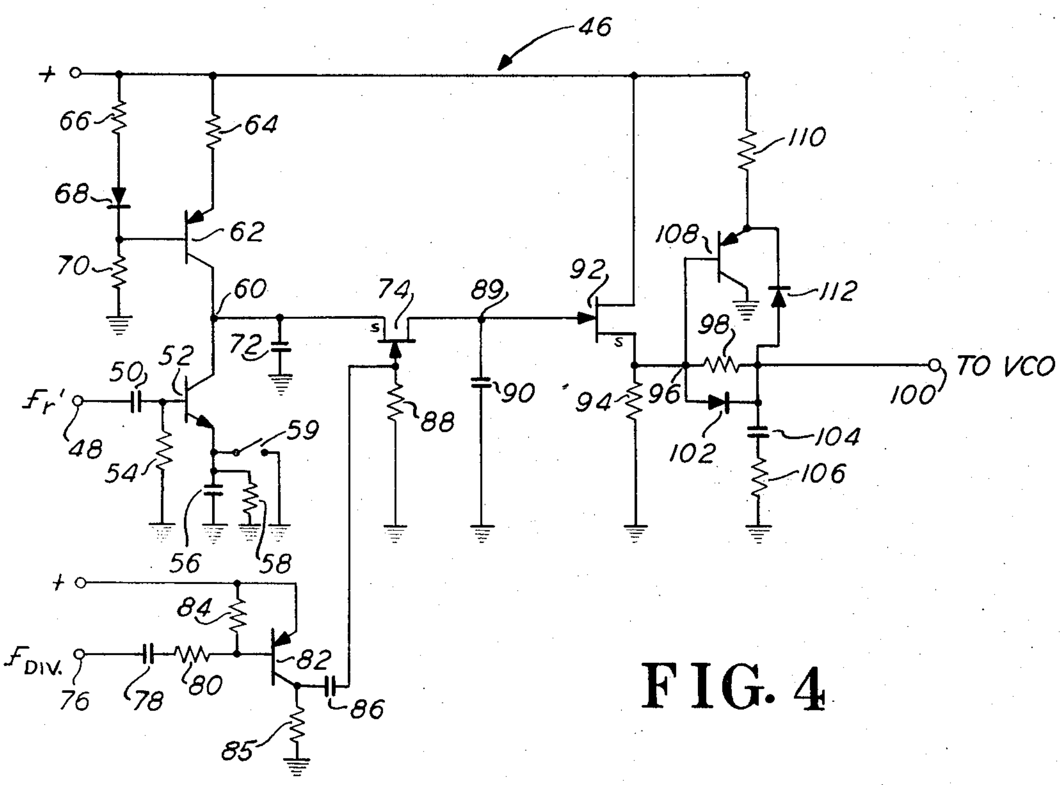
FIG. 4 is a schematic diagram showing sample and hold circuitry used within the synthesizer of the present invention.

The details of the sample and hold circuit 46 are shown in FIG. 4. The synthesizer reference signal $f_{r'}$ is applied to the input terminal 48, which connects to one electrode of a capacitor 50, whose second electrode connects to the base of an NPN transistor 52. The base of transistor 52 is also connected to ground through resistor 54. The emitter of transistor 52 connects through a parallel arranged capacitor 56 and resistor 58 to ground. The emitter is also connected to ground through a switch 59 which, when closed, establishes a first voltage range and, when open, establishes a second, higher voltage range for the sample and hold circuit 46. The collector of transistor 52 is connected to a node 60 which connects to the collector of a PNP transistor 62. Transistor 62 has its emitter connected via resistor 64 to a source of positive potential. The same positive potential is connected through a series resistor 66 to the cathode of a diode 68, whose anode is connected to the base of transistor 62. The base of transistor 62 also connects to ground through a resistor 70 for completing the temperature compensated, constant current circuit.

The node 60 is connected to one electrode of a capacitor 72 whose second electrode is connected to ground. Node 60 also connects to the source electrode of a P-type field effect transistor 74. FET 74 acts as a switch upon application of the signal $f_{DIV}$ from the variable ratio divider 42 which is applied to the input terminal 76. Terminal 76 connects through a serially arranged capacitor 78 and resistor 80 to the base of a PNP transistor 82. The emitter of transistor 82 connects to a source of positive potential which is also connected via a resistor 84 to the base thereof. The collector of transistor 82 connects to ground through a resistor 85 and connects to an electrode of a capacitor 86, whose second electrode connects to the gate of FET 74. The gate of FET 74 is connected through a resistor 88 to ground.

Figure 5:
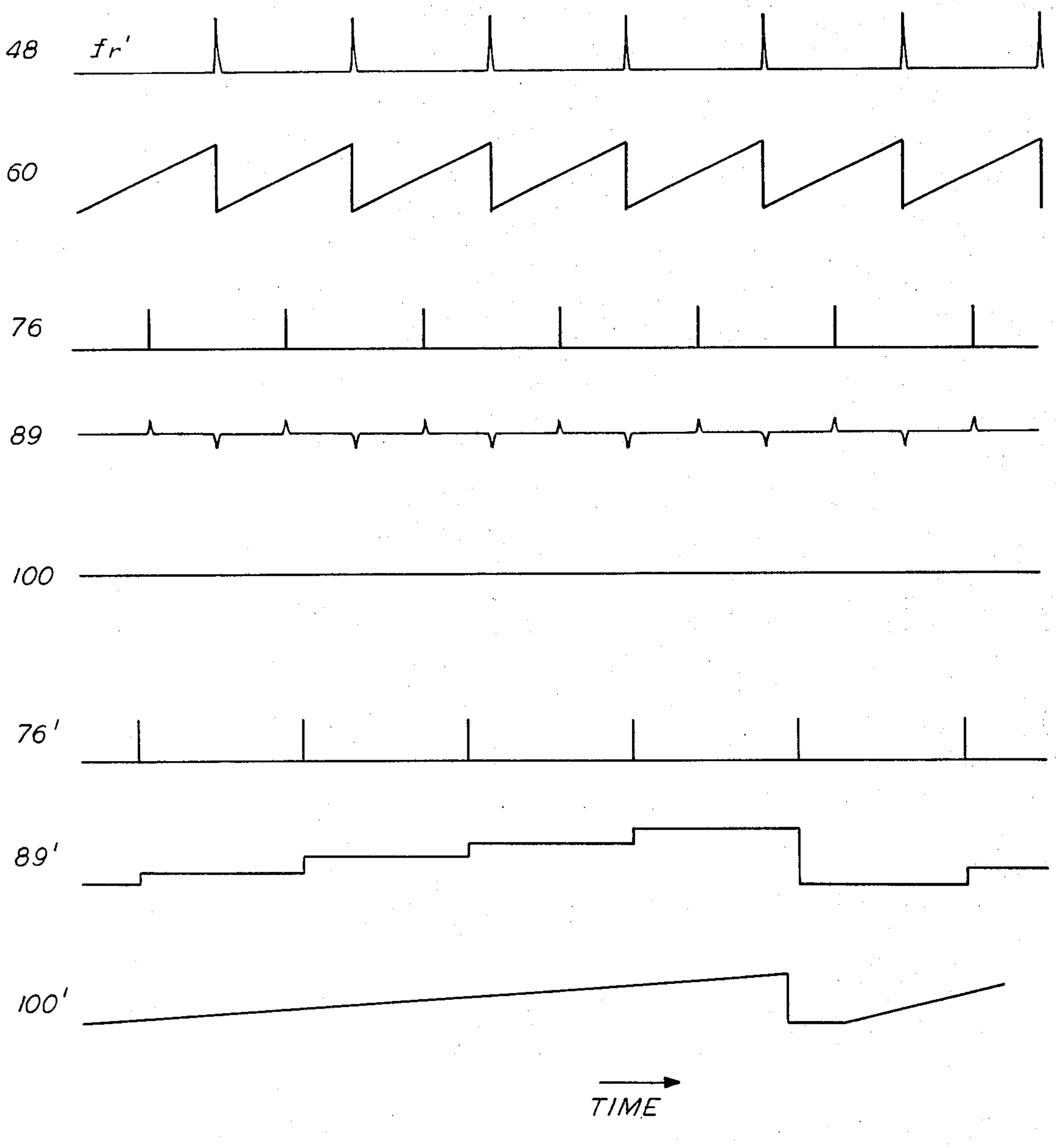
FIG. 5 is a diagram showing various waveforms useful in explaining the operation of FIG. 4.

A series of pulses is generated by the reference frequency $f_r'$ at terminal 48. These pulses are used to turn on the switch formed by transistor 52. When they appear, transistor 52 shorts the voltage appearing across the capacitor 72, which rises in a linear fashion due to the constant current generated through transistor 62 to ground. The result is a triangular wave at node 60, as shown in FIG. 5. This voltage waveform is applied to the source electrode of FET 74. FET 74 is turned on for very short periods of time, approximately a small percentage of the period of a triangular wave, by the switching action of transistor 82 in response to the signal from the variable ratio divider $f_{DIV}$ at terminal 76.

The drain electrode of FET 74 connects to an electrode of storage capacitor 90 and then to ground. The drain electrode also connects to the gate electrode of a second P-type field effect transistor 92, whose drain electrode is connected to the source of positive potential. The source electrode of FET 92 connects to ground via a resistor 94 and also to the node 96 which forms the input to a stabilizing network.

The voltage appearing across the capacitor 90 at node 89 is almost a constant level voltage, provided the input impedance of the stabilizing network is large enough to prevent discharge of capacitor 90. If the frequency reference signal $f_r'$ and the output of the variable ratio divider $f_{DIV}$ are in phase, the signal applied to the stabilizing network through the FET 92 will be a constant level voltage signal having a constant amplitude. If the two signals are out of phase, the signal applied to the stabilizing circuit could vary from a slowly changing DC level to a stepped DC level, as will be described.

The stabilizing network includes a stabilizing resistor 98 connected between the node 96 and the output terminal 100 of the sample and hold circuit 46. A diode 102 is connected in shunt with the resistor 98 having the anode thereof connected to the node 96 and the cathode connected to the output terminal 100. The output terminal 100 is also serially connected to ground through a capacitor 104 and the resistor 106, wherein the resistor 98, capacitor 104, and resistor 106 form the stabilizing network. When the potential at node 96 exceeds an amount determined by the breakthrough voltage of diode 102, the diode shunts resistor 98, thus removing it from the stabilizing network and accelerating the charging of capacitor 104.

The second portion of the stabilizing network is formed by connecting the node 96 to the base of a PNP transistor 108 whose connector is connected to ground. The emitter of transistor 108 connects through a resistor 110 to the source of positive potential. The output terminal 100 connects to the anode of a diode 112, having its cathode connected to the emitter of transistor 108. As the potential at node 96 decreases, transistor 108 is turned on for shunting the capacitor 104 to ground through the diode 112. When the potential at node 96 is small, as in a stabilized condition, the stabilizing network is not shunted by the combination of the transistor 108 and diode 112.

In operation, the synthesizer 26 produces a frequency output established by the voltage controlled oscillator 36. Under stable conditions, the phase-locked oscillator produces a 12.01 MHz frequency, for example, which is applied to the output terminal of the synthesizer 26 as a signal $f_s$ and also applied to the phase-locked loop through amplifier 44 to the variable ratio divider 42. Here, the signal is divided by the digital value of 1201 for producing an output of 10 KHz. This signal is compared with the 10 KHz reference signal $f_{r'}$ received at input terminal 48. As seen in FIG. 5, the reference signal $f_r'$ produces a triangular waveform at the node 60. When the signal from the variable ratio divider $f_{DIV}$ is in phase lock with the signal at node 60, as shown at 76 in FIG. 5, the output at node 89 is generally a DC level showing slight variations during the switching of transistors 52 and 82. The result at the output terminal 100 is a DC level. If the frequency of synthesizer 26 is to be adjusted, for example, to an output of 14.51 MHz, the digital signal applied to the variable ratio divider 42 is increased to the value of 1451. This increased ratio, when dividing the output of the voltage control oscillator 36, produces a new signal $f_{DIV}$ which has a lesser frequency than the originally applied signal and is out of phase therewith. Such a signal is shown in FIG. 5 at the line labeled 76'. The resulting signal turns on the FET 74 at varying points on the triangular waveform signal 60. The resulting potential at node 89 is then a stepped potential as illustrated by the wave shape 89' in FIG. 5. The output at terminal 100 of the synthesizer then becomes an increasing stepped potential as shown in the waveform 100'. The stepped output continues until the signals $f_r'$ and $f_{DIV}$ approach each other in frequency and phase. At this time, the output will return to a constant DC level. If the stepped potential at node 89 becomes larger than the break-through voltage of diode 102, the increasing stepped potential at output terminal 100 will increase in steps instead of smoothly due to the shunting of the stabilizing resistor 98. This will accelerate the search of the synthesizer 26 toward acquisition wherein $f_r'$ equals $f_{DIV}$.

Referring now to FIGS. 1 and 2*a* and 2*b*, the frequency plan of the present invention will be described as it applies to the operation of the FDM telephone communications system. Assuming station 14 is the calling station, the handset of that station is removed while that station adjusts the output frequency of its synthesizer 26 to match the receive frequency of the called station plus the reference frequency $f_s + f_r$. Assuming station 14 is calling station 12, the output of the synthesizer 26 at station 14 is adjusted such that its programable frequency $f_s$ becomes 12.01 MHz (the called stations receive frequency) plus the reference frequency $f_s + f_r$ or 14.51 MHz. The 14.51 MHz signal is applied both to the balanced modulator 24 and to the balanced modulator 30 of station 14. When the handset is removed from station 14, the transmitter therein is enabled thereby making it possible to apply audio frequencies $f_{audio}$ to the input of the balanced modulator 20. The balanced modulator 20 is also supplied with a carrier, i.e., the reference frequency of 2.5 MHz. Thus, the audio signals entering balanced modulator 20 are modulated to produce a double sideband signal whose frequency is $f_r \pm f_{audio}$. This signal is then passed through the single sideband filter 22 which removes the remaining carrier and one of the sidebands for providing an output frequency of $f_r + f_{audio}$, for example.

At the second balanced modulator 24, the signals from the filter 22 ($f_r + f_{audio}$) and the signals from the synthesizer 26 ($f_s + f_r$) are combined. Ignoring the audio frequency for the moment, the output of the balanced modulator 24 becomes $f_s$ and $f_s + 2f_r$. This pair of signals, ignoring audio, is then passed through the filter 29 which has a bandwidth of less than $2f_r$. This eliminates one of the signals, in this case $f_s + 2f_r$. Then, $f_s = 14.5 - 2.5$ or 12.01 MHz. Thus, the signal applied to the magnetic coupler 16 is $f_s$ or 12.01 MHz; the signal $f_s + 2f_r$ having been removed by the filter 29. This signal travels over the coaxial cable 18 to the magnetic coupler 16 of station 12 and, as a practical matter, to all couplers within the system. However, the third balanced modulator 30 of each station will only produce usable audio information when the carrier and modulating signal frequencies are substantially equal. Since calling station 14 is now adjusted to transmit at 12.01 MHz, the modulator 30 in called station 12 will pass the audio signal modulating the 12.01 MHz signal from station 14 as station 12 is applying that same frequency to its third modulator 30 as its fixed home receive frequency. It should be noted here that since all stations 12 through N are synchronized to the same reference frequency, there is a negligible frequency error throughout the system. The output of the modulator 30 is then filtered by the band pass filter 32 to assure that only the audio frequency $f_{audio}$ reaches the receiver within the handset of station 12. It should also be noted that the adjusted frequency applied to the third balanced modulator within station 14 of 14.51 MHz is the fixed transmit frequency of station 12.

When station 12 removes its handset, the audio signal $f_{audio}$ applied to the input of the first balanced modulator modulates the reference frequency $f_r$. The output $f_r \pm f_{audio}$ is filtered by filter 22 and applied as $f_r + f_{audio}$ to the input of the second balanced modulator 24. At the balanced modulator 24, these signals are combined such that the output of the modulator 24 is $f_s + f_r$ or 14.51 MHz. The band pass filter 29 filters all signals but those included in the home transmit frequency range shown in FIG. 2a. Thus, the carrier frequency of 14.51 MHz is applied to the magnetic coupler 16 and over the highway 18 to the coupler 16 of station 14. Station 14 previously adjusted its synthesizer upon calling station 12 to apply the signal $f_s + f_r$ or 14.51 MHz to the input of the balanced modulator 30. As a result, the output of the balanced modulator 30 in calling station 14 includes only the audio frequency modulating the carrier frequency 14.51 MHz (the fixed transmit frequency of station 12), which is filtered by the filter 32 for applying $f_{audio}$ to the station 14. This completes the audio connection between the two stations.

Figure 6:
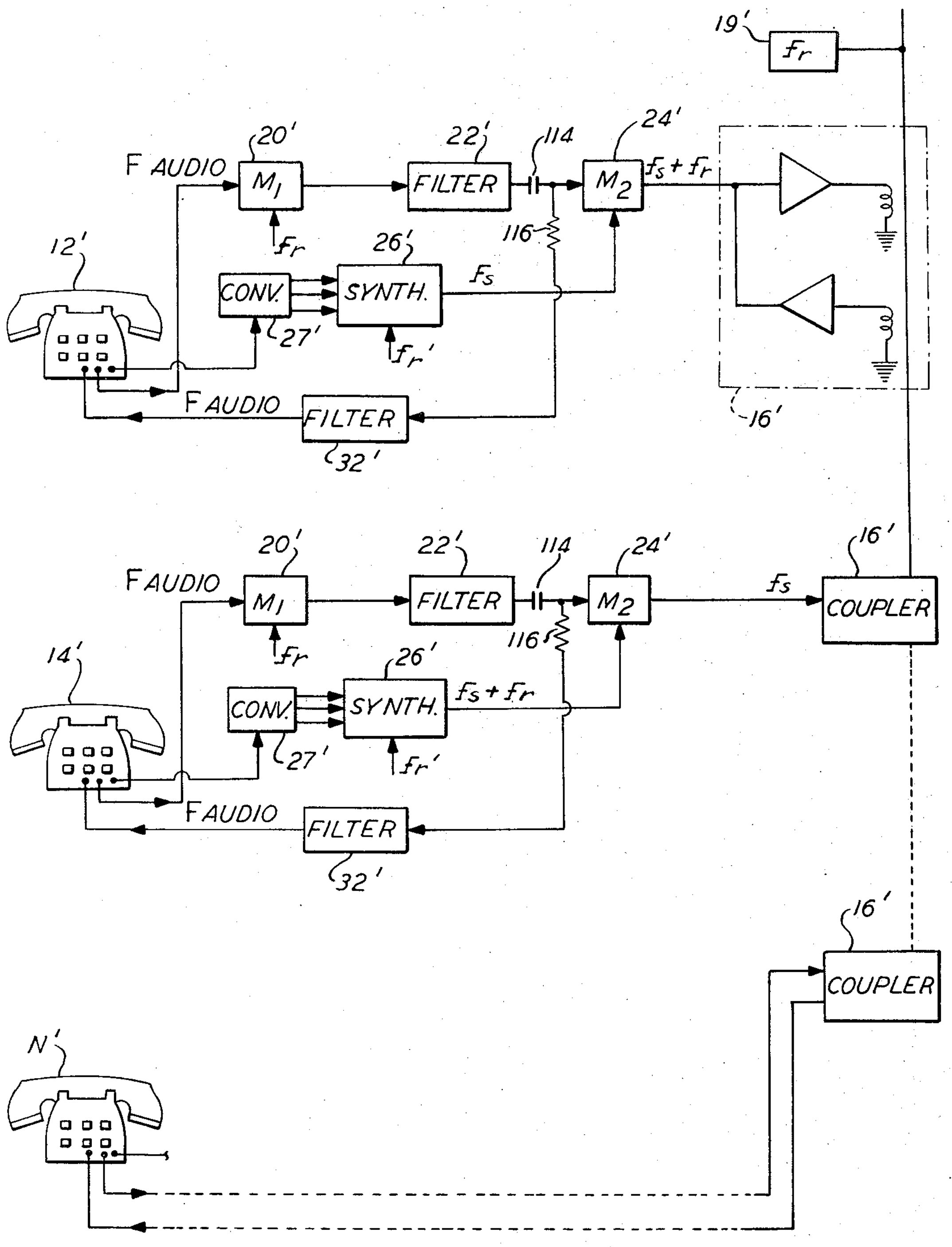
FIG. 6 is a block diagram, similar to FIG. 1, showing a modification of the FDM communications system of the present invention.

A modification of the FDM communication system is shown in FIG. 6. Here, the improvement takes advantage of a known principle that a bilateral amplifier or other electronic device may be used for two widely diverse frequencies in such a way that the device will amplify one frequency in one direction while amplifying a second frequency in the opposite direction.

With this phenomena in mind, it has been found that the balanced modulator 24', shown in FIG. 6, will produce an output signal for application to the coupler 16', such as $f_s + f_r + f_{audio}$ while at the same time producing an output signal at its opposite terminal that includes only an audio signal $f_{audio}$. That is, the modulating signal $f_s$ from the synthesizer 26' in the station 12' modulates the signal $f_r + f_{audio}$ for application to the coupler 16'. The signal $f_s$ applied from the coupler 16' is demodulated by the same synthesizer signal $f_s$ for presented $f_{audio}$ at the input port of the modulator 24'. A capacitor 114 is serially connected between the filter 22' and the modulator 24' for passing the frequencies above the reference frequency $f_r$ from the filter to the modulator while blocking audio range frequencies, such as $f_{audio}$, in the opposite direction. A resistor 116 connects the input port of the modulator 24' to the input of filter 32' for completing the receive circuit path. Therefore, FIG. 6 is similar to FIG. 1 with the exception that the third modulator 30 has been eliminated as has the filter 29.

In the system shown in FIG. 1, the desired frequency $f_s + f_r + f_{audio}$ and the synthesizer frequency $f_s$ each pass through the filter 29 onto the cable 18. Synthesizer frequency $f_s$ then passes back through the receive circuit path to the input port of the third modulator 30. This signal has the same frequency as the synthesizer frequency $f_s$ being received from the calling station 14, for example. However, the two identical frequencies are out of phase, thus producing a DC signal at the output port of the third modulator 30. The arrangement shown in FIG. 6 eliminates this problem by using the balanced modulator 24' in both the transmit and receive circuit paths. This arrangement also eliminates the requirement for two coaxial cables between the second modulator 24' and the coupler 16' and between the coupler 16' and the third modulator 30'. That is, the arrangement of FIG. 6 allows for a single coaxial cable between all couplers as in FIG. 1. This further simplifies the installation required for the FDM telephone communication system of the present invention.

There are other methods of utilizing the equipment described herein to achieve communication. In the system demonstrated, a calling station sets the synthesizer so that it receives the called station transmitter frequency. An alternate system can be derived in which the opposite is accomplished. That is, the called station is set by the calling station. A third variant can be derived in which all receiving frequencies are adjusted by signaling from a common source. These variations are usable in certain applications, but the most generally applicable approach is the approach described hereinabove.

It should also be observed that each station may be easily modified to change its fixed home transmit and receive frequency. This allows for easy resetting of the telephone number of each station. Further, broad band transmission of data or television signals is simply accomplished by assigning a plurality of channels to a data station. For example, if it were desirable to transmit a 1–40 KHz data signal at a fixed home frequency of 12.05 MHz, channels 12.01 through 12.09 could be used. This would provide a 7 KHz guard band on each side of the data channel. Only the band pass width of filters 22 and 32 would require adjustment. Additionally, broader band data, such as television signals, may be accommodated or additional channels outside the bandwidth of the telephone frequencies of the communications system described, since coaxial cables are typically capable of carrying bandwidths ten to twenty times as wide as the telephone frequencies described herein.

The embodiments of the invention in which an exclusive property or privilege is claimed are defined as follows:

1. A frequency division multiplexing communications system, comprising:

a plurality of subscriber stations each including means for generating a first predetermined signal in that respective subscriber station;

a single coaxial cable;

means for generating a system reference frequency signal in said single coaxial cable connected to said single coaxial cable;

each subscriber station including transmit and receive circuit means connecting said subscriber station to said single coaxial cable;

means in each subscriber station connected to said single coaxial cable receiving said system reference frequency signal and introducing said system reference frequency signal into said transmit and receive circuit means;

means connected to said means for generating said first predetermined signal including a synthesizer for introducing a selectively predeterminable synthesizer frequency signal into said transmit and receive circuit means;

a voltage controlled oscillator in each synthesizer, a programmable divider connected to each subscriber station means for generating said first predetermined signal for receiving the controlled output signal from said voltage controlled oscillator, and dividing said controlled output responsive to said first predetermined signal;

a sample and hold type phase comparator circuit serially connecting said programmable divider to said voltage controlled oscillator whereby the phase in said series connection is determined by said phase comparator;

said phase comparator including means for comparing said reference frequency signal against the divided signal from said programmable divider, and for producing a direct current control voltage responsive thereto to said voltage controlled oscillator, whereby the voltage controlled oscillator output signal and the said synthesizer frequency signal from each of said synthesizers is controlled;

whereby a selectively predetermined synthesizer frequency at each said subscriber station for receiving and for transmitting communications is established.

2. A frequency division multiplexing communications system as claimed in claim 1, wherein:

said means for generating a predetermined synthesizer signal in each subscriber station further includes adjustable means for generating a plurality of signals;

said transmit and receive circuit means including transmit circuit means and receive circuit means;

a first one of said plurality of signals combining with said system reference frequency signal in said synthesizer to establish a predetermined receive frequency in said receive circuit means for each subscriber station; and said first one of said plurality of signals further combining with said reference frequency signal in said synthesizer and then with said reference frequency signal in said transmit circuit means to establish a predetermined transmit frequency in said transmit circuit means for each subscriber station.

3. A frequency division multiplexing communications system as claimed in claim 2, wherein:

said transmit frequency and said receive frequency differ by an amount equalling said reference frequency signal.

4. A synthesizer having a wide range of acquisition for use in a frequency division multiplexing communications system, comprising:

a voltage controlled oscillator having an output and controlled input for generating a synthesizer frequency output to be used in said system;

a programmable divider connected in series to said voltage controlled oscillator output for dividing said frequency output;

a sample and hold type phase comparator circuit serially connecting said programmable divider to said voltage controlled oscillator input whereby the phase in said series connection is determined by said phase comparator;

means for generating a reference frequency signal;

said sample and hold type phase comparator circuit including pulse amplifying means for receiving output from said programmable divider;

said sample and hold type phase comparator circuit including a first storage means, a source of constant current connected to said first storage means, switching means driven by said reference frequency signal for removing said source of constant current from said first storage means thereby creating a first signal;

said sample and hold type phase comparator circuit further including a second, signal storage means;

second switching means driven by pulse amplifying means, said second switching means connecting said first storage means to said second storage means; and high impedance means connecting said second storage means to the voltage controlled oscillator input for passing a direct current voltage level when said first signal at said first storage means is in phase with said divider output signal at said second switching means, and for passing a stepped direct current voltage when said signals are out of phase, thereby increasing the acquisition range of said synthesizer.

5. A synthesizer for use in a frequency division multiplexing communications system as claimed in claim 4, additionally comprising:

said high impedance means including a stabilizing network; and circuit means for by-passing said network when said stepped direct current voltage exceeds a predetermined level.

6. A synthesizer for use in frequency division multiplexing communications system as claimed in claim 5, wherein:

said stabilizing network includes resistance means and capacitance means serially connected to ground;

said voltage controlled oscillator input is connected between said resistance means and said capacitance means;

said by-pass circuit includes diode means for shunting a positive going direct current signal around said resistance means to rapidly charge said capacitive means; and said by-pass circuit further includes second diode means and transistor means serially connected for shunting a negative giving direct current signal around said resistance means to rapidly discharge said capacitive means, thereby increasing the acquisition range of said synthesizer.

7. A frequency division multiplexing communications system, comprising:

a plurality of subscriber stations;

transmit and receive circuit means in each of said subscriber stations connecting each of said plurality of subscriber stations to a common single coaxial cable in communications connection;

means for generating a system reference frequency signal connected to said single coaxial cable;

means including a first modulator means in said transmit and receive circuit means for introducing and receiving said reference frequency signal into said circuit means of each of said plurality of subscriber stations whereby information to be communicated between said plurality of subscriber stations is modulated within said system at said reference frequency;

means including synthesizer means for generating a predetermined frequency signal distinctive to each of said plurality of subscriber stations;

means connected to said transmit and receive circuit means in each subscriber station for combining said system reference frequency signal and said frequency signal distinctive to each of said subscriber stations including second modulator means connected to receive said information modulated from said first modulator means and connected to receive the predetermined frequency signal distinctive to each subscriber station from said synthesizer for further modulating said information to be communicated as transmitted information over said transmit and receive circuit means at a transmit frequency equal to said reference frequency plus said predetermined frequency, and for demodulating information communicated as received information from said transmit and receive circuit means at a receive frequency equal to said predetermined frequency signal, whereby a transmit frequency signal and a receive frequency signal are established for each subscriber station with the frequency of said signals differing from each other by a frequency value equal to said system reference frequency signal.

8. A frequency division multiplexing communication system as claimed in claim 7, wherein:

said second modulator means including first, second and third terminal ports;

said modulated information from said first modulator means is connected to said first terminal port and said signal from said synthesizer means is connected to said second terminal port wherein a modulated output signal appears at said third terminal port representing said transmitted information at said transmit frequency of each subscriber station;

said third terminal port connects to said single coaxial cable;

means connected between said first terminal port and said first modulator means for passing said modulated information from said first modulator means to said second modulator means and for blocking demodulated information appearing at said first terminal port representing receive information at said receive frequency of each subscriber station; and means including filter means connecting said first terminal port to said subscriber station to connect said demodulated information thereto.

9. A frequency division multiplexing communication system as claimed in claim 8, wherein:

said synthesizer means in each of said plurality of said subscriber stations is connected to that station and includes means for adjusting the frequency of said synthesizer, wherein a calling subscriber station of said plurality of subscriber stations adjusts its synthesizer frequency signal to a frequency equal to the transmit frequency of a called subscriber station;

said second modulator means in said calling subscriber station thereby modulates said adjusted synthesizer frequency signal applied to said second terminal port equal to the transmit frequency of said called subscriber station, with said modulated information from said first modulator means applied to said first port equal to the reference signal frequency, to apply a first usable signal to said third terminal port equal to said receive frequency of said called station, and to apply a second unusable signal to said third terminal port equal to said receive frequency plus twice the reference frequency; and said second modulator in said calling subscriber station demodulates said receive information from said single coaxial cable to apply demodulated information to said first terminal port thereof which is demodulated from the received information at the frequency of the synthesizer frequency signal applied to said second terminal port equal to the transmit frequency signal of said called subscriber station.

10. A frequency division multiplexing communications system, including a cable; means for generating a system reference frequency signal in the cable; a plurality of subscriber stations each connected to said cable by transmit and receive circuit means, and each subscriber station including means for generating a first predetermined signal in that respective subscriber station; means connected to said cable in each subscriber station receiving said system reference frequency signal and introducing said system reference frequency signal into said transmit and receive circuit means; synthesizer means in each subscriber station introducing a synthesizer frequency into said transmit and receive circuit means, said synthesizer means comprising:

a. a programmable divider connected serially to a voltage controlled oscillator receiving the controlled output signl from said voltage controlled oscillator, and dividing said controlled output responsive to said first predetermined signal in that respective subscriber station producing a divided frequency;

b. a sample and hold type phase comparator circuit connected serially to said programmable divider and to said voltage controlled oscillator;

c. a frequency divider connected to said phase comparator adapted to receive and divide said reference frequency signal whereby a divided reference frequency signal is produced to said phase comparator;

d. said phase comparator adapted to receive said divided reference frequency signal and said divided frequency whereby the phase in said synthesizer means is determined by said phase comparator;

e. said phase comparator including means for comparing said divided frequency against said divided reference frequency signal and means for producing from said reference frequency signal against said divided frequency a direct current voltage signal to said voltage controlled oscillator whereby the voltage controlled oscillator output signal is controlled;

whereby a selectively predetermined frequency at each said subscriber station for receiving and transmitting communications is established.

* * * * *